United States Patent
Alfonseca et al.

(10) Patent No.: US 8,983,898 B1
(45) Date of Patent: *Mar. 17, 2015

(54) EXTRACTING INSTANCE ATTRIBUTES FROM TEXT

(71) Applicant: Google Inc., Mountain View, CA (US)

(72) Inventors: Enrique Alfonseca, Horgen (SZ); Marius Pasca, Sunnyvale, CA (US); Enrique Robledo-Arnuncio, Zurich (CH)

(73) Assignee: Google Inc.., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,586

(22) Filed: Sep. 16, 2013

Related U.S. Application Data

(63) Continuation of application No. 13/084,504, filed on Apr. 11, 2011, now Pat. No. 8,538,916.

(60) Provisional application No. 61/322,801, filed on Apr. 9, 2010.

(51) Int. Cl.
*G06F 17/30* (2006.01)

(52) U.S. Cl.
CPC .... *G06F 17/30707* (2013.01); *G06F 17/30734* (2013.01)
USPC .......................................... 707/603; 707/794

(58) Field of Classification Search
CPC ................................................ G06F 17/30734
USPC ................................................. 707/603, 794
See application file for complete search history.

(56) References Cited

U.S. PATENT DOCUMENTS

| | | |
|---|---|---|
| 6,823,333 B2 | 11/2004 | McGreevy |
| 7,366,715 B2 | 4/2008 | Liu et al. |
| 7,890,526 B1 | 2/2011 | Brewer et al. |
| 2001/0000356 A1 | 4/2001 | Woods |
| 2004/0034632 A1 | 2/2004 | Carmel et al. |
| 2005/0198026 A1 | 9/2005 | Dehlinger et al. |
| 2007/0233656 A1 | 10/2007 | Bunescu et al. |
| 2009/0083226 A1 | 3/2009 | Kawale et al. |
| 2009/0271363 A1 | 10/2009 | Bayliss |
| 2009/0282012 A1 | 11/2009 | Konig et al. |
| 2010/0145678 A1 | 6/2010 | Csomai et al. |
| 2010/0195909 A1 | 8/2010 | Wasson et al. |
| 2011/0035456 A1 | 2/2011 | Milne et al. |

OTHER PUBLICATIONS

Durme et al. "Weakly-Supervised Acquisition of open-Domain Classes and Class Attributes from Web Documents and Query logs" Proceedings of ACL-08: HL T, p. 19-27, Jun. 2008.

(Continued)

*Primary Examiner* — Jorge A Casanova
*Assistant Examiner* — William Spieler
(74) *Attorney, Agent, or Firm* — Fish & Richardson P.C.

(57) ABSTRACT

Methods, systems, and apparatus, including computer programs encoded on a computer storage medium, for extracting instance attributes from text are described. In one aspect, a method exploits weakly-supervised and unsupervised instance relatedness data, available in the form of labeled classes of instances and distributionally similar instances. The method organizes the data into a graph containing instances, class labels, and attributes. The method propagates attributes among related instances, through random walks over the graph.

20 Claims, 7 Drawing Sheets

(56) References Cited

OTHER PUBLICATIONS

Talukdar et al. "Weakly-Supervised Acquisition of Labeled Class Instances using Graph Random Walks" Proceedings of the 2008 Conference on Empirical Methods in Nature language Processing, p. 582-590, Oct. 2008.

Hughes et al. "Lexical Semantic Relatedness with Random Graph Walks" Proceedings of Joint Conference on Empirical Methods in Natural Language Processing and Computational Natural Language Learning, p. 581-589, Jun. 2007.

Szumlanski et al., "Automatically Acquiring a Semantic Network of Related Concepts," Proceedings of the 19th ACM International Conference on Information and Knowledge Management, CIKM'10, Oct. 2010, 10 pages.

Marco De Boni, et al. "Automated Discovery of Telic Relations for WordNet," In Proceedings of the First International WordNet Conference, 2002, 6 pages.

Davidov et al. "Superior and Efficient Fully Unsupervised Pattern-based Concept Acquisition Using an Unsupervised Parser," In Proceedings of the Thirteenth Conference on Computational Natural Language Learning, CoNLL '09, Jun. 2009, 9 pages.

EXTRACTING INSTANCE ATTRIBUTES FROM TEXT

CROSS-REFERENCE TO RELATED APPLICATIONS

This application is a continuation of U.S. patent application Ser. No. 13/084,504, filed on Apr. 11, 2011 entitled "Extracting Instance Attributes From Text," which claims the benefit under 35 U.S.C. §119(e) of U.S. Provisional Application No. 61/322,801, filed on Apr. 9, 2010 entitled "Extracting Instance Attributes From Text," the entirety of which are hereby incorporated by reference.

BACKGROUND

This disclosure relates to information extraction.

The Internet provides access to a wide variety of resources, e.g., video and/or audio files, web pages for particular subjects, news articles, and so on. Resources of particular interest to a user can be identified by a search engine in response to a user query. The user query includes one or more search terms, and the search engine uses these terms to identify documents that are responsive to the user query.

The semantics related to the words in a language can be used to derive semantic relations among the words. A search engine can use these semantic relations as an aid in finding documents or terms that are related to the terms of the user query. In one framework, semantic concepts are labeled according to classes, with each class representing a particular semantic concept. For example, the semantic concept of painkillers can be represented by the class of the same name. Each class has one or more instances that belong to the class. An instance is an object that belongs to the class. For example, the class "painkillers" includes the instances of cloxacillin, vicodin, and other types of drugs that are typically classified as painkillers. Each instance, in turn, can have one or more attributes, each of which describes a quality or characteristic of the instance. Knowing what attributes are associated with the instance described by the search term (e.g., whether "cost" or "side effects" is associated with "cloxacillin") can help the search engine in the search process.

Various information retrieval frameworks that derive attributes from text exist. In a framework, information instances (e.g., "cloxacillin") that are semantic objects that belong to specific semantic concepts are identified, as are information classes (e.g., "antibiotics"). To extract attributes, a conventional method can submit list-seeking queries that describe the instance or class (e.g., "cloxacillin" or "antibiotics") as search terms to general-purpose web search engines and analyze documents retrieved in response to the queries. Common structural patterns (e.g., Hyper-Text Markup Language (HTML) structures) in the retrieved documents are used to extract the attributes of the information instance or class.

SUMMARY

Disclosed herein are systems and methods of extracting instance attributes from text. In general, one aspect of the subject matter described in this specification can be embodied in method that include the actions of receiving a first information instance, the first information instance being a first semantic object belonging to one or more first information classes, wherein the first semantic object is a word or a phrase; identifying second information instances related to the first information instance, each second information instance being a second semantic object belonging to one or more second information classes, wherein each second semantic object is a word or a phrase, and wherein each information class represents a particular semantic concept; identifying, in a graph stored in a memory and representing information instances and attributes describing the information instances, first attributes describing the first information instance and second attributes describing the second information instances, wherein the graph includes attribute nodes each representing a respective attribute, instance nodes each representing a respective information instance, and edges each connecting an attribute node and an instance node, each edge representing that a non zero likelihood exists that the attribute of the connected attribute is related to the information instance of the connected instance node, and wherein the graph further includes paths connecting pairs of instance nodes, wherein the existence of a path indicates that the a semantic relationship exists between the information instances of the connected instance nodes; performing random walks in the graph from the first information instance to the second attributes through the second information instances and from the first information instance to the first attributes; calculating relatedness values that measure transition probabilities of the random walks from the first information instance to the first attributes, and from the first information instance to the second attributes; and selecting at least a portion of the first and second attributes based on the relatedness values and storing data associating the selected attributes with the first information instance on a storage device.

These and other embodiments can optionally include one or more of the following features. The method can optionally include receiving a query including a query term, the query term identifying the first information instance; ranking the first and second attributes based on the relatedness values; refining the query using the first and second attributes according to the ranking of the first and second attributes based on the relatedness values; and displaying the refined query on a display device.

Calculating the relatedness value can include calculating a weighted list that maps the first and second attributes to the first information instance and second information instances; and calculating a transition probability the first information instance and second information instances to the first and second attributes based on the weighted list.

Calculating the transition probability can include calculating a weight of an attribute in reference to an information instance, the attribute being one among the first and second attributes, and the information instance being one among the first information instance and second information instances; dividing the weight by a sum of weights of all weights of the first and second attributes in reference to the information instance; and designating a quotient resulting from the dividing as the transition probability.

Identifying the second information instances can include identifying one or more information classes to which the first information instance belongs; identifying information instances belonging to the identified information classes; and designating the identified information instances belonging to the identified information classes as the second information instances.

Performing the random walks can include, from the first information instance, executing a first random move to one of the information classes; from the one of the information classes, executing a second random move to a second information instance belonging to the information class; and from the second information instance, executing a third random move to an attribute. Additionally or alternatively, performing the random walks can include, from the first information instance, executing a first random move to the first information instance; and from the first information instance, executing a second random move to an attribute.

Identifying the second information instances based on the first information instances can include identifying the second information instances based on distributional similarities between the first information instance and the second information instances, the distributional similarities measuring an extent to which the first information instance and the second information instances appear in identical textual contexts. Performing the random walks can include, from the first information instance, executing a first random move to one of the second information instances; and from the one of the second information instances, executing a second random move to an attribute.

Calculating the relatedness values can include calculating, for each attribute of the first and second attributes, a relatedness value that measures a relatedness between the first information instance and the attribute based on a probability that the random walks that start from the first information instance end at the attribute.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
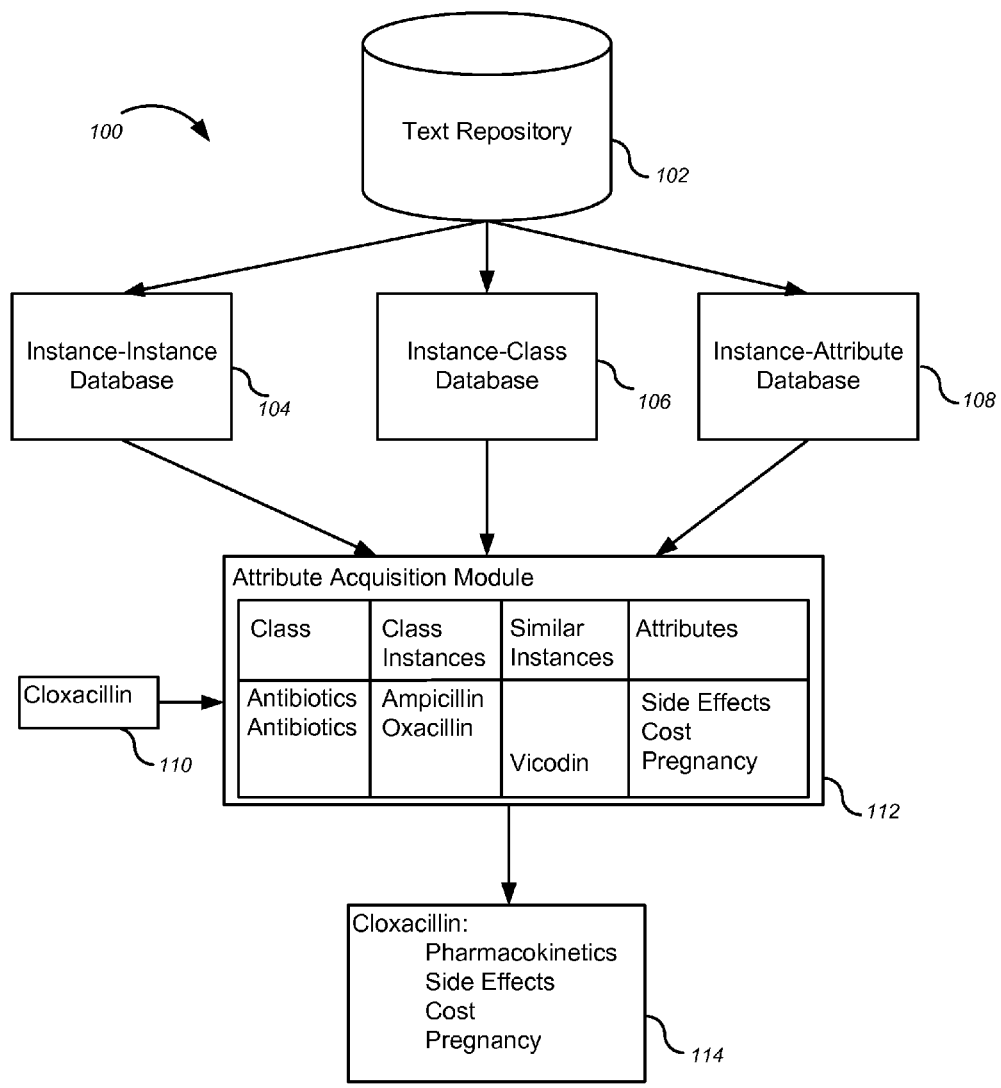
FIG. 1 is a block diagram of an example system implementing techniques for extracting instance attributes from text.

FIG. 1 is a block diagram of an example system 100 implementing techniques for extracting instance attributes from text. The system 100 extracts attributes from an example information instance 110. The system 100 can receive information instance 110, for example, from a query submitted by a user, from an electronic document hosted on a website, or from a data processing request submitted from an application program. The information instances are semantic objects that belong to information classes. The information classes, in turn, each describe a semantic concept. For example, an information class of "antibiotics" describes words that have meaning relating to a specific class of drugs. The information instance of "cloxacillin" is a specific semantic object, e.g., a word whose meaning relates to an identifiable instance of the information class.

Given the information instance 110 (e.g., "cloxacillin"), the system 100 can extract a set of attributes describing properties of information instance 110. More specifically, using an attribute acquisition module 112, the system 100 can retrieve the most relevant attributes (e.g., side effects, cost, etc.) that describe properties of information instance 110. A property of information instance 110 is a property that is commonly associated with the information instance 110 historically or logically.

In some implementations, the attribute acquisition module 112 can extract the relevant attributes from an instance-attribute database 108. The instance-attribute database 108 stores known mappings between one or more instances and one or more attributes. The known mappings can be generated from text repository 102. The text repository 102 can include historical user queries, web content, and other information that can be used as clues to associate a particular instance with an attribute. For example, if a significant number of user queries include both the information instance "cloxacillin" and the attribute "pharmacokinetics," the system 100 can determine that the attribute "pharmacokinetics" describes at least one aspect or characteristic of information instance "cloxacillin," and store a mapping between "pharmacokinetics" and "cloxacillin" in instance-attribute database 108.

In addition to extracting attributes describing information instance 110 from instance-attribute database 108, the attribute acquisition module 112 can extract attributes that describe other information instances that are related to the information instance 110. For convenience, the information instance 110 is referred to as a first information instance, and the other information instances are referred to a second information instances. The attribute acquisition module 112 can associate the attributes describing the second information instances to the information instance 110. The process of associating an attribute that describes a first information instance and that does not describe a second information instance is referred to as propagating the attribute. By propagating the attributes, the attribute acquisition module 112 can increase the number of attributes associated with the information instance 110 to include both attributes that initially describe the information instance 110 and attributes that do not initially describe the information instance 110. To propagate the attributes, the attribute acquisition module 112 can identify the second information instances that are related to the information instance 110 by consulting relation databases (e.g., instance-instance database 104 and/or instance-class database 106).

Instance-instance database 104 can store second information instances that are similarly distributed as an information instance. Distributional similarities can capture an extent to which textual contexts in which the words or phrases occur are similar, with the intuition that phrases that occur in similar contexts tend to share similar attributes. Two information instances are similarly distributed if they appear in a corpus of documents in a similar pattern, including, for example, appearing frequently in a same body of text. Distribution similarities can be measured using similarity scores, which can be calculated using an external process. Similarity scores can range from zero (two information instances never appear together or appear separately in common contexts in text) to one (two information instances always appear together). The system 100 can identify the second information instances that are similarly distributed as the first information instance by, for example, calculating a similarity score to be associated with the first and second information instance. The similarity score can measure how often the second information instances and first information instance appear in same contexts, e.g., in a same sentence, a same paragraph, a same electronic document, or a same website, based on an analysis of content in text repository 102. The system 100 can determine that two information instances are similarly distributed when the similarity score satisfies a distribution similarity threshold. For example, the system 100 can calculate a similarity score between "vicodin" and "cloxacillin" based on a frequency that the two terms appear together or in similar contexts, and determine that "vicodin" and "cloxacillin" are similarly distributed if the similarity score satisfies a threshold. Additionally or alternatively, the system 100 can calculate the similarity score between two information instances by examining a collection of user submitted queries in text repository 102.

The system 100 can determine that two information instances are similarly distributed even though the two instances are not exactly similar in text or in meaning. For example, the system 100 can determine that information instance "vicodin" is similarly distributed as information instance 110 "cloxacillin" because "vicodin" appears with "cloxacillin" within a same document or same user query sufficiently frequently, even though "vicodin" and "cloxacillin" may not be similar to each other in spelling or meaning. The system 100 can further consult instance-attribute database 108 to identify attributes (e.g., "pregnancy") that describe the second information instances (e.g., "vicodin") and propagate the attribute to the first information instance (e.g., "cloxacillin").

In addition to instance-instance database 104, system includes an instance-class database 106. Instance-class database 106 can store information instances as well as classes to which the information instances belong. Information instances in a same class share similar traits. A class of instances can be in the form of a set of instances (e.g., {"ampicillin," "oxacillin," "cloxacillin," "benzylpenicillin"}) associated with a corresponding class label (e.g., "antibiotics") that describes the shared trait. For convenience, the classes will be referred to by their class labels (e.g., as "class 'antibiotics"). Classes of information instances can be generated from content (e.g., webpages and/or user queries) in text repository 102 using various information classification techniques from a third party.

Using instance-class database 106, attribute acquisition module 112 can identify the classes (e.g., "antibiotics") to which the first information instance (e.g., information instance 110) belongs. Attribute acquisition module 112 can further identify the second information instances (e.g., "ampicillin" and "oxacillin") that belong to the same classes, for example, by consulting the instance-class database 106 again. Attribute acquisition module 112 can consult instance-attribute database 108 to identify attributes that describe the second information instances. For example, system can identify attribute "side effects" describing "ampicillin" and attribute "cost" describing "oxacillin."

Attribute acquisition module 112 of the system 100 can aggregate the attributes "pharmacokinetics" (directly describing information instance 110), "side effects" (describing second information instance "ampicillin"), "cost" (describing second information instance "oxacillin"), and "pregnancy" (describing second information instance "vicodin"). Attribute acquisition module 112 can designate the aggregated attributes 114 as instance attributes extracted for information instance 110 "cloxacillin" and the attributes for the other instances. By associating attributes that describe the second information instances to information instance 110, the system 100 propagates the attributes (e.g., "side effects") from one information instance (e.g., "ampicillin") to another information instance (e.g., information instance 110 "cloxacillin"), thus increasing the number of attributes associated with the information instance. Aggregated attributes 114 can have various uses (e.g., for refining a user's search query or for generating a list of properties describing various aspects of a particular term).

Information instance 110 can belong to a large number of classes (e.g., "penicillin," "Beta-lactam antibiotics," "antibiotics," "prescription medicine," "medicine," and so on). Likewise, each class can include a large number of instances. In addition, many second information instances can be distributed similarly to information instance 110. Each information instance can have a large number of attributes. In propagating the attributes, the system 100 can identify which of those attributes do describe the properties of information instance 110, and which ones do not. The system 100 can make the identification by calculating a relatedness value for each attribute and ranking the attributes. The system 100 can limit the attributes propagated to information instance 110 to those attributes that, measured by a relatedness value, are most likely to describe the properties of information instance 110. Other attributes (e.g., lower-ranked attributes) can be omitted from propagation. Further details on how the system 100 identifies relevant attributes associated with information instance 110 are described below.

Figure 2:
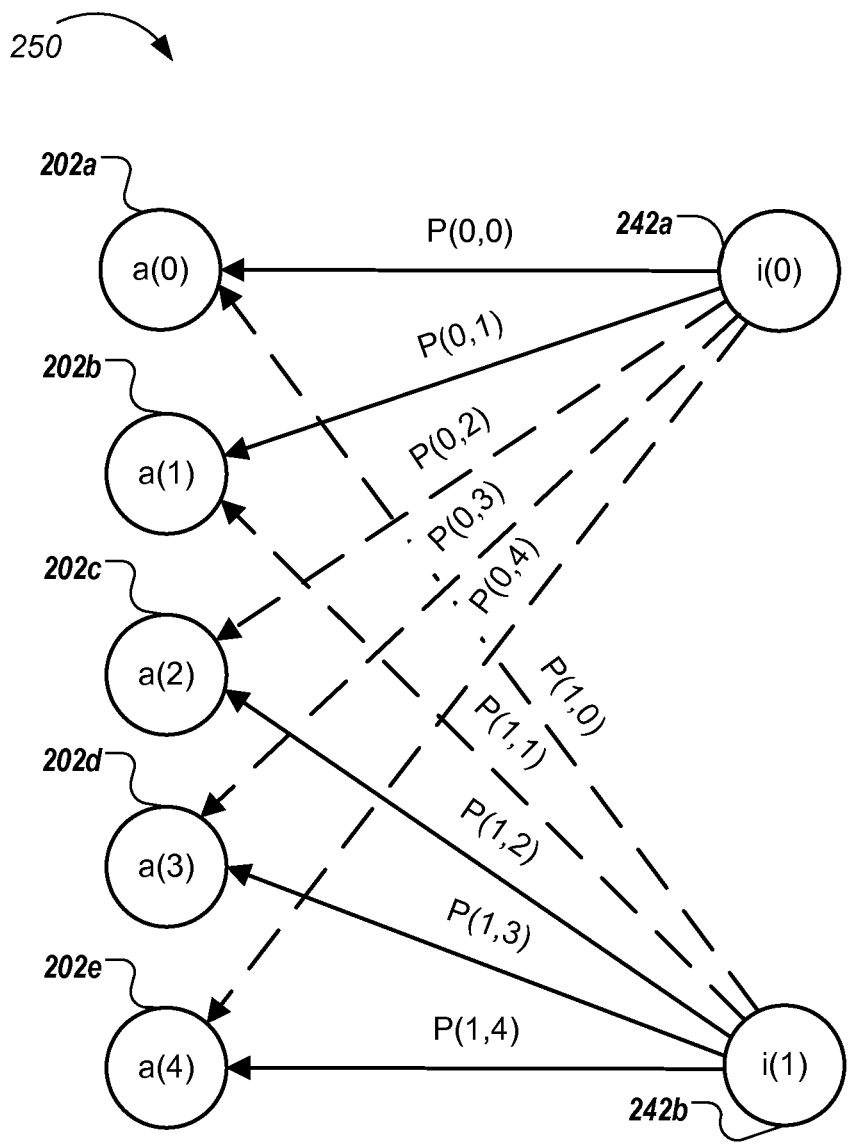
FIG. 2 is an example instance-attribute graph illustrating relationships between information instances and attributes.

FIG. 2 is an example instance-attribute graph 200 illustrating relationships between information instances and attributes. For convenience, instance-attribute graph 200 will be described in reference to system 100, which can store graph 200 in one or more data structures on a memory device of the system 100. The system 100 can use instance-attribute graph 200 to identify the relevant attributes for an information instance.

The topology of instance-attribute graph 200 will be used to illustrate information instances and attributes describing properties of the information instances. Instance-attribute graph 200 includes attribute nodes 202a-e and instance nodes 242a-b as well as edges between attribute nodes 202 and instance nodes 242. Attribute nodes 202a-e can represent attributes a(0)-a(4), respectively. Instance nodes 242a and 242b can represent two information instances i(0) and i(1), respectively. An edge between an instance node (e.g., instance node 242a) and an attribute node (e.g., attribute node 202b) can indicate that there is a likelihood (e.g., a probability that is greater than zero) that instance node 242a is related to attribute node 202b. Each edge is associated with a value (e.g., P(0,1)) that is used to calculate a probability of transition in a random walk from an information instance to an attribute (e.g., from information instances i(0) to attribute a(1)), which will be used to identify the relevant attributes. The random walk is a computer formalization of a trajectory that includes taking successive random moves from one node (source) of a graph to another node (target) of the graph. Each move is associated with a probability of transition (or transition probability), which defines the probability of starting from a source node (e.g., node 242a) to a destination node (e.g., node 202b).

To calculate the value (e.g., P(0, 1)), the system 100 extracts a weighted list of attributes for each information instance using existing attribute extraction methods. For example, given an information instance i(j), the system 100 can extract a weighted list A(j) between each attribute and information instance i(j):

$$A(j)=[(a(0),w(j,0)),(a(1),w(j,1)),\ldots,(a(|A|),w(j,|A|))] \quad (1)$$

where A(j) is the weighted list of all attributes of information instance i(j), a(m) is an attribute, w(j, m) is a weight of the relationship between information instance i(j) and attribute a(m) as determined by the existing attribute extraction method, and |A| is a number of attributes in the set. In some implementations, A(j) can include all attributes for all information instances, even those that are not deemed to be related to information instance i(j). An attribute (e.g., attribute a(n)) that does not describe information instance i(j) can have a weight of zero (e.g., w(j, n)=0).

In some implementations, the system 100 normalizes the weights in the list such that the weights sum up to a normalized total (e.g., one). Using the normalized weight, the system 100 calculates values of all edges in FIG. 2. A value (e.g., value P(0, 1) of an edge (e.g., the edge between instance node 242a representing information instance i(0) and attribute node 202b representing attribute a(1)) is used to measure a probability of transitioning from information instance i(0) to of attribute a(1). In general, a probability of transitioning from information instance i(j) to attribute a(k) is, in some implementations, calculated using the following formula:

$$P(j,k) = \frac{W(j,k)}{\sum_{l=0}^{|A|} W(j,l)} \quad (2)$$

where P(j, k) is the probability of transition between information instance i(j) and attribute a(k). In some implementations, A is a set of all attributes for all information instances. In other implementations, A is a set of attributes that are related to information instance i(j). W(j, k) is a weight of attribute a(k) in reference to information instance i(j).

W(j, k) can have a value of zero in some situations (e.g., when attribute a(k) does not describe information instance i(j)). In these situations, P(j, k) can have a value of zero. In some implementations, the edges between an information instance (e.g., information instance i(0)) and attributes that do not describe the information instance (e.g., attributes a(2)-a(4)) can be omitted from graph 200. In some implementations, these edges can be represented in graph 200, where each of these edges can be associated with a transition probability of zero.

In general, the more strongly information instances i(0) and i(1) are semantically related, the more likely it is for information instances i(0) and i(1) to share common attributes a(0)-a(4). As an illustration, the system 100 initially identifies only attributes a(0) and a(1) for i(0) from instance-attribute database 108, and the system 100 initially identifies only attributes a(2), a(3), and a(4) for i(1) from the same database. Under these circumstances, using the propagation process, the system 100 can still relate all attributes a(0)-a(4) to both information instances i(0) and i(1) as attributes that describe information instances i(0) and i(1), if the system 100 determines that information instances i(0) and i(1) are related. To distinguish initially identified attributes from propagated attributes, edges between an information instance and attributes initially identified as describing the information instance are represented in solid lines, where edges between an information instance and attributes that are propagated to the information instance are represented in dashed lines.

In some implementations, propagating the attributes includes creating edges between an information instance attributes that are propagated to the information instance. In these implementations, the dashed lines are added after the random walks are performed. For example, the system 100 can create the edges between instance nodes 242 and attribute nodes 202 if original edges between an information instance and attributes that do not describe the information instance (e.g., the dashed lines) were not initially included from graph 200. In other implementations, the dashed lines are in existence before the random walks are performed. The system 100 can adjust the transition probability for an existing edge if the original edges between an information instance and attributes that do not describe the information instance (e.g., the dashed lines) were included in graph 200 but each has an original transition probability of zero.

Figure 3:
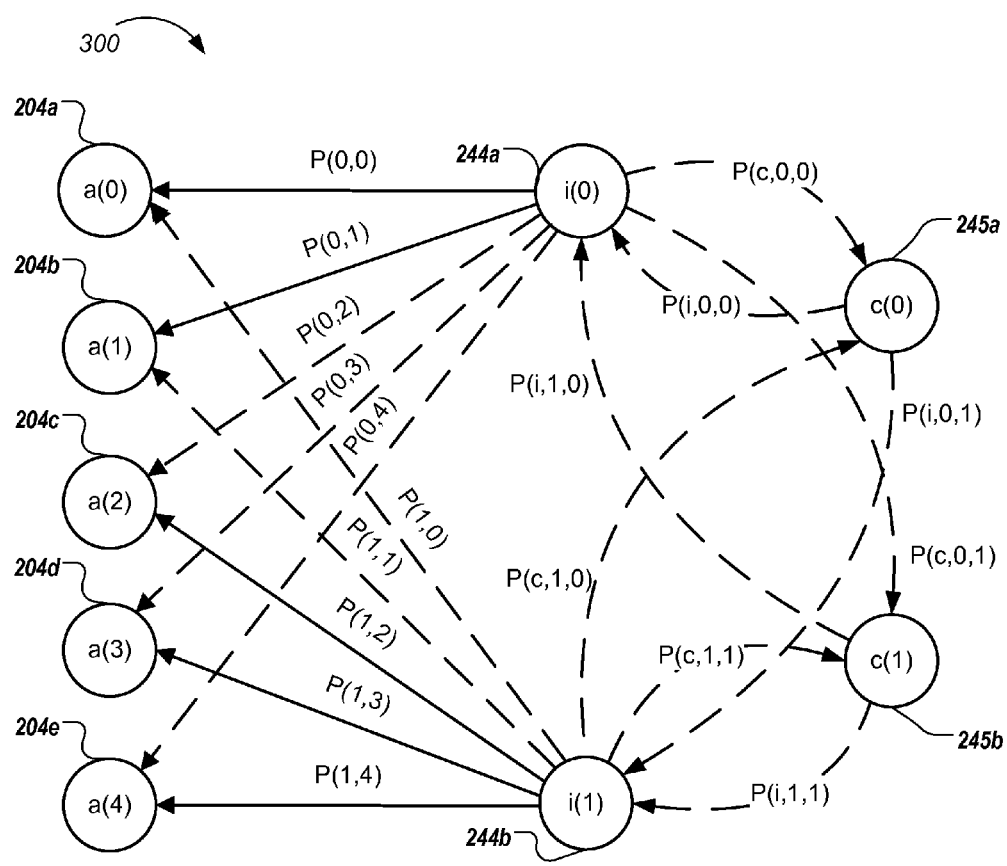
FIG. 3 is an example extended graph illustrating relationships between information instances and attributes based on class membership.

FIG. 3 is an example extended graph 300 illustrating relationships between information instances and attributes based on class membership. Extended graph 300 can be an extension of instance-attribute graph 200. For convenience, extended graph 300 will be described in reference to system 100, which can store the extended graph 300 in one or more data structures on a memory device of the system 100.

Extended graph 300 includes instance nodes 244 and attribute nodes 204, as well as edges between instance nodes 244 and attribute nodes 204. The edges are associated with probabilities of transition from instance nodes 244 to attribute nodes 204. In addition, the extended graph 300 can further include class nodes 245a and 245b, representing information classes c(0) and c(1).

Information instances i(0) and i(1) can relate to each other in various ways. For example, some types of relationships between information instances i(0) and i(1) are described in "IsA" pairs, where each of the information instances i(0) and i(1) "is a" particular instance of a class (e.g., class c(0) or c(1)) and forms an "IsA" pair with the class. Information instances i(0) and i(1) can each be a member of multiple classes. For example, information instances i(0) and i(1) can each form an "IsA" pair with class c(0) and an "IsA" pair with class c(1). "IsA" pairs can be represented as weighted pairs that include an information instance and an associated class (e.g., information instance "audi" and class "car manufacturers"; or information instance "cloxacillin" and class "antibiotics"). If two information instances belong to a same class, the system 100 can determine that the two information instances are likely to share attributes. For example, if information instances i(0) and i(1) belong to a same class (e.g., c(0)), the system 100 can determine that attribute a(0), which describes information instances i(0), is likely to also describe information instance i(1).

The "IsA" pairs allow for an extension of instance-attribute graph 200, by adding a layer for the classes c(0) and c(1). Classes c(0) and c(1) of information instance i(0) and i(1) can be identified using existing information classification methods. The existing information classification methods can also be used to calculate a weight measuring a probability the a particular information instance (e.g., information instance i(0)) belongs to a particular class (e.g., class c(1)). From the classes and weights, the system 100 creates a weighted list of classes for an information instance. For example, for an information instance i(j), the system 100 creates the following list:

$$C(j)=[(c(0),w(j,0)),(c(1),w(j,1)),\ldots,(c(|C|),w(j,|C|))] \quad (3)$$

where C(j) is the weighted list of all classes to which information instance i(j) belongs, |C| is a number of all classes, and w(j, m) is a weight calculated by the existing method that represents a probability that information instance i(j) belongs to class c(m). In some implementations, C(j) includes all classes, even those classes to which information instance i(j) does not belong. The weight between the information instance i(j) and a class c(k) to which information instance i(j) does not belong is zero (e.g., w(j, k)=0).

The weights in the weighted list C(j) are normalized such that all weights add up to a normalized total (e.g., one). The system 100 uses the normalized weights to produce a class probability distribution P(c, j, m), where c(m) is a class of the information instance i(j), and "c" is a notation mark indicating that the probability transition is from an information instance to a class. In a random walk across graph 300, probability P(c, j, m) measures a probability of transitioning from information instance i(j) to a class c(m). The probability distributions P(c, j, m) are associated with edges pointing from instance nodes 244 to class nodes 245.

In addition, aggregation and normalization of weights by classes (e.g., classes c(0) and c(1)) rather than information instances (e.g., information instances i(0) and i(1)) produce a probability distribution P(i, m, j), which indicates a probability of transitioning from a class c(m) to an information instance i(j) in extended graph 300, where "i" is a notation mark indicating that the probability transition is from a class to an information instance. The probability distribution P(i, m, j) can be associated with edges pointing from class nodes 245 to instance nodes 244.

Extended graph 300 can be used to propagate attributes across information instances using random walks. The system 100 performs random walks on extended graph 300 by taking successive random moves. The random walks are used to propagate attributes from one information instance (e.g., information instance i(1)) to another (e.g., information instance i(0)) when the two information instances belong to a same class (e.g., class c(0) and/or c(1)). In some implementations, the following random moves are performed during the random walks on extended graph 300:

1. From an instance node 244 (e.g., instance node 244a, representing information instance i(0)), execute a random move to one of the class nodes of the instance node (e.g., class node 245a, representing class c(0), to which information instance i(0) belongs). The probability of the move is governed by the probability P(c, j, m) where j and m can be values indicating source and destination, respectively (e.g., j=0 and m=1, when the move is from information instance i(0) to class c(1)). The moves can follow the edges pointing from instance nodes 244 to class nodes 245.
2. From a class node 245 reached in stage (1) (e.g., class node 245a representing class c(0)), execute a random move to an instance node that belongs to the class node (e.g., instance node 244b, representing information instance i(i) that belongs to class c(0)). The probability of each move is governed by probability P(i, m, j) where j and m can be values indicating source and destination, respectively (e.g., j=1 and m=1, when the move is from class c(1) to information instance i(1)). The move can follow the edges pointing from class nodes 245 to instance node 244.
3. From an instance node 244 reached in stage (2) (e.g., instance node 244b, representing information instance i(1)), execute a random move to one of the attribute nodes of the instance node (e.g., attribute node 204c, representing attribute a(2), which describes information instance i(1)). The probability of each move is governed by the probability P(j, m) where j and m can be values indicating source and destination, respectively (e.g., j=1 and m=2, when the move is from information instance i(1) to attribute a(2)). The move can follow the edges pointing from instance nodes 244 to attribute nodes 204.

By the end of the random walk process, each original information instance i(j) is assigned a ranked list of attributes, where the attributes can be sorted by the probability of reaching them when departing an instance node representing information instance i(j) via the three stages. The system 100 can apply a threshold value to the ranked list. Those attributes having probabilities of being reached that satisfy the threshold can be associated to the information instance i(j) as instance attributes.

Figure 4:
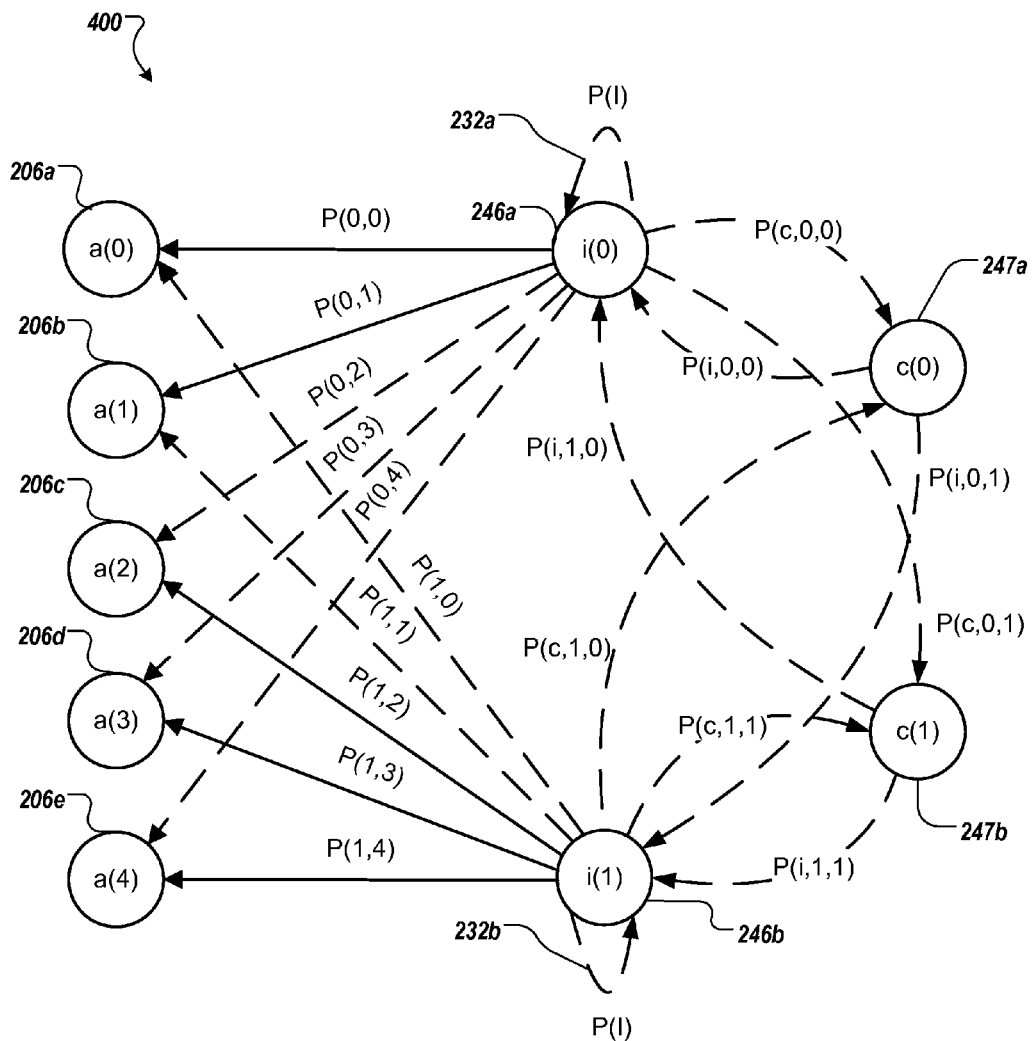
FIG. 4 is an example graph illustrating relationships between information instances, classes, and attributes, including loop-back features.

FIG. 4 is an example graph 400 illustrating relationships between information instances, classes, and attributes including loop-back features. For convenience, graph 400 will be described in reference to system 100, which can store graph 400 in one or more data structures on a memory device of the system 100.

Graph 400 includes instance nodes 246 and attribute nodes 206, as well as edges between instance nodes 246 and attribute nodes 206. The edges are associated with probabilities of transition from instance nodes 246 to attribute nodes 206. In addition, graph 400 includes class nodes 247a and 247b, representing information classes c(0) and c(1). Edges between instance nodes 246 and class nodes 247 are associated with probabilities of transitions from instance nodes 246 to class nodes 247 as well as probabilities of transition from class nodes 247 to instance nodes 246.

In graph 400, edges 232 are added. Edges 232 are loopback edges that point from an instance node 246 back to the same instance node 246. For example, edge 232a can point from instance node 246a (representing information instance i(0)) back to instance node 246a; and edge 232b can point from instance node 246b (representing information instance i(1)) back to instance node 246b. Edges 232 can be utilized to address the situations in which an information instance is not related with any class, and for distinguishing which attributes were initially assigned to the information instance.

Regarding the first situation, if a particular information instance (e.g., information instance i(0)) does not have an "IsA" relationship with any class, edge 232a is utilized as an alternative to stages (1) and (2) of the random walk as described above. Lacking a class to which information instance i(0) belongs, a random move cannot be made from information instance i(0) to a non-existent class of information instance i(0). Edge 232a allows the move to a class to be skipped. For example, the system 100 can perform a move from information instance i(0) to information instance i(0) in place of the stages (1) and (2) of the random walks, following edge 232a.

Regarding the second situation, the edges 232 can be utilized to provide additional ways to retain information distinguishing which attributes were initially assigned to the information instances (e.g., attributes a(0) and a(1) to information instance i(0)), and which attributes are propagated (e.g., attributes a(2), a(3), and a(4) originally assigned to information instance i(1) and propagated to information instance i(0)). Some advantages of retaining the information include reducing an impact of possible noise in the classes. For example, some classes are general catchall classes (e.g., a class of information "cloxacillin" can be "entities" or "kinds"), which may not be particularly useful during attribute propagation. Some advantages of retaining the information can alternatively or additionally include enhancing the ability to distinguish accidental common class membership. It is possible that although two information instances (e.g., information instances i(0) and i(1)) belong to the same class, the most prominent attributes of the two information instances can be significantly different within a given textual data source. For example, information instances "north korea" and "south korea," two countries that are closely related geographically and belong to a same class "asian countries," each has distinct attributes. When extracting attributes from either query logs or web documents, the most salient attributes for the former typically relate to "leader" and "political system," whereas the most salient attributes for the latter typically relate to "tourism," "geography," and "history."

Edges 232 are added in graph 400 to address the issues arising from "catch-all" classes and accidental common class membership. Each edge 232 is associated with a transition probability equal to a value P(I). In some implementations, P(I) is a configurable constant. In order to maintain a probability distribution over all outgoing edges to be executed in stage (1) of the random walk described above, the probability distribution P(c, •) is normalized to add up to 1.0-P(I) (e.g., the normalized total can be 1.0-P(I) instead of one). For example, as shown in graph 400, it is possible to use P(I)=0.5, which gives the same weight to the initially assigned attributes and to the attributes that are propagated through class labels.

In some implementations, the propagation of attributes using classes includes modified random walks that proceed as follows:
1. From each instance node (e.g., instance node 246a representing information instance i(0)), with probability P(I), remain in the same instance node. With probability 1.0-P(I), start a random walk, which will have two stages (e.g., to class nodes 247, and to other instances nodes 246).
2. From an instance node that has been reached in stage (1) (e.g., instance node 246a representing information instance i(0)), execute a random move to an attribute node 206, following the edges between instance nodes 246 to attribute nodes 206 in graph 400. By the end, each original information instance i(j) can be assigned a list of attributes. The list of attributes can be a ranked list, sorted by the probability of reaching them when departing from information instance i(j).

Figure 5:
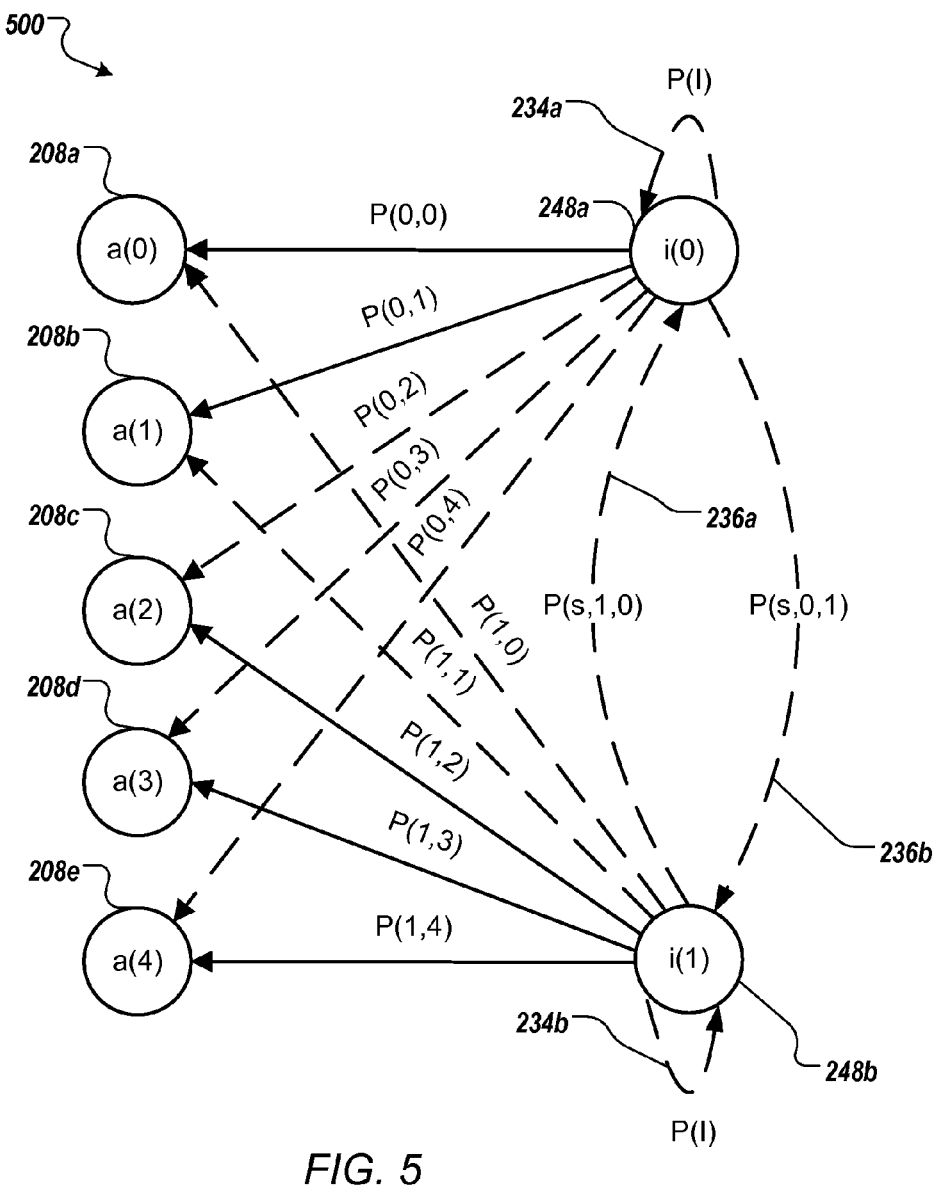
FIG. 5 is an example graph illustrating relationships between instances and attributes based on distribution similarity.

FIG. 5 is an example graph 500 illustrating relationships between information instances and attributes based on distribution similarity. For convenience, graph 500 will be described in reference to the system 100, which can store extended graph 500 in one or more data structures on a memory device of the system 100.

Some types of relationships between information instances i(0) and i(1) are distributional similarities. Distributional similarities can scale well to large text collections, since acquisition of distributional similarities can be done through parallel implementations. Distributional similarities can be calculated by a process external to the system 100, or, alternatively, the system 100 can be configured to determine distributional similarities.

When information instances i(0) and i(1) similarly distributed (e.g., when the similarity score between information instances i(0) and i(1) satisfies a threshold), if an attribute (e.g., a(0)) is an attribute of i(0), then the system 100 can determine that the attribute a(0) is likely to be an attribute of i(1).

Extended graph 500 includes instance nodes 248 and attribute nodes 208, as well as edges between instance nodes 248 and attribute nodes 208. The edges between instance nodes 248 and attribute nodes 208 can be associated with probabilities of transition from instance nodes 248 to attribute nodes 208. The system 100 can use existing methods to extract similarly distributed information instances for a given information instance i(j). The system 100 creates a weighted list I(j) for information instance i(j) as follows:

$$I(j)=[(i(0),w(j,0)),(i(1),w(j,1)), \ldots ,(i(|I|),w(j,|I|))] \quad (4)$$

where I is the weighted list all information instances distributionally similar to information instance i(j), |I| is a number of all information instances, and w(j, m) is a weight (e.g., a similarity score) between information instances i(j) and i(m), calculated by the existing method. In some implementations, I is a list of all information instances, regardless of weather the information instances are distributionally similar to information instance i(j). For those information instances (e.g., i(k)) not distributionally similar to information instance i(j), the weight can be zero (e.g., w(j, k)=0). The weights can be normalized such that all weights add up to a normalized total (e.g. one).

Edges from instance nodes 248 to attribute nodes 208 of graph 500 are associated with the normalized weights. In addition, edges 236 are added to graph 500, each edge 236 corresponding to a probably of transition for one instance node (e.g., instance node 248a representing an information instance i(0)) to another instance node (e.g., instance node 248b representing a similarly distributed information instance i(1)).

Edges 234 representing transitions from each instance node 248 to itself are added. Each edge 234 (e.g., edge 234a) is associated with a probability P(I). Probability P(I) can be tuned to give more or less weight to the original attributes (e.g., attributes a(0) and a(1) of information instance i(0)) over propagated attributes (e.g., attributes a(2), a(3), and a(4) of information instance i(i)). The system 100 can propagate the attributes in a two-stage process, first transitioning from an instance node (e.g., instance node 248a) to itself or to other instance nodes representing similar information instances (e.g., instance node 248b), and then transitioning to attribute nodes (e.g., attribute nodes 208).

Figure 6:
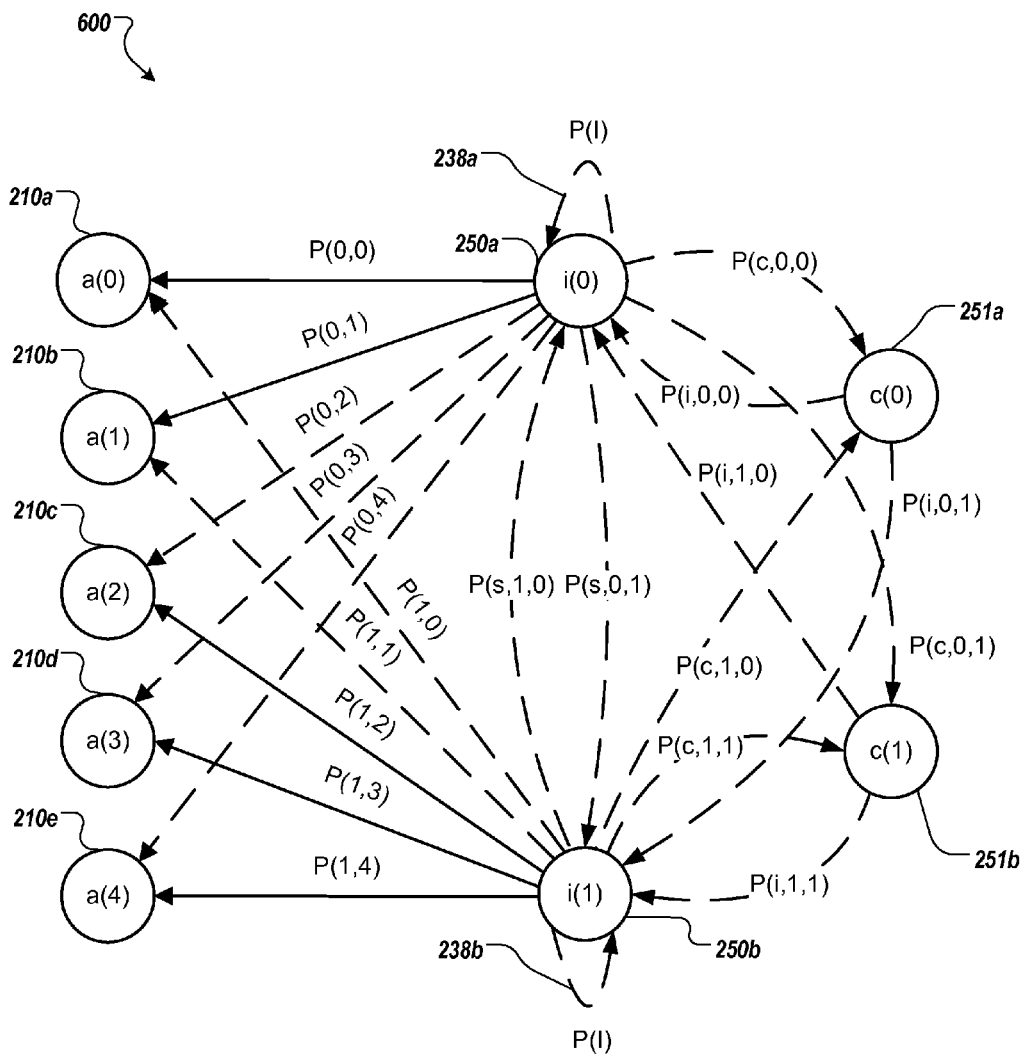
FIG. 6 is an example graph illustrating relationships between instances and attributes based on distribution similarity and class membership.

FIG. 6 is an example graph 600 illustrating relationships between information instances and attributes based on distribution similarity and class membership. For convenience, graph 600 will be described in reference to the system 100, which can store extended graph 600 in one or more data structures on a memory device of the system 100.

Graph 600 includes instance nodes 250 and attribute nodes 210, as well as edges between instance nodes 250 and attribute nodes 210. The edges are associated with probabilities of transition from instance nodes 250 to attribute nodes 210. In addition, graph 600 can further include class nodes 251a and 251b, representing information classes c(0) and c(1). Graph 600 includes edges between instance nodes 250 and class nodes 251 as well as edges between instance nodes 250 and instance nodes 250, each edge associated with a transition probability.

In graph 600, probabilities that are associated with edges going out from instance nodes 250 are normalized so their sum is a normalized total (e.g., one):

$$P(I) + \sum_{m=0}^{|I|} P(s, j, m) + \sum_{n=0}^{|C|} P(c, j, n) = 1.0 \quad (5)$$

where P(s, j, m) is a probability of transition from information instance i(j) to information instance i(m) that is similarly distributed as i(j); s is a notation mark meaning a transition from one instance to another instance; P(c, j, n) is a probability of transition from information instance i(j) to class c(n) to which information instance i(j) belongs; I is a set of all information instances similarly distributed as i(j), and C is a set of all classes to which information instance i(j) belongs. P(I) is a value designated for looping back (e.g., from information instance i(j) back to i(j)). An example value of P(I) is ⅓.

Using the topology of graph 600, the system 100 propagates attributes (e.g., attributes a(2), a(3), and a(4) that describe one information instance (e.g., information instance i(1)) to another information instance (e.g., information instance i(0)). The propagation can be a two-stage process. In a first stage, the system 100 can calculate, for each instance node 250, the probability of transitioning to any instance node 250 in graph 600 by either one of the following moves:

1. by following the self-loop (e.g., edges 238a and 238b), governed by probability P(I);
2. by randomly walking in two moves through the class nodes, for example, by following edges from instance nodes 250 to class nodes 251 and from class nodes 251 to instance nodes 250. The probability of the transition from an information instance i(j) to an information instance i(k) through a class c(m) can be calculated from transition probabilities P(c, j, m) and P(i, m, k); or
3. by randomly walking to a distributionally similar information instance, for example, by following edges from one instance node 250 to another instance node. The probability of the transition from a first information instance i(j) to a second information instance i(k) can be calculated from transition probability P(s, j, k).

In a second stage, the system 100 can move from an instance node 250 reached in the first stage to an attribute node 210. The system can calculate a probability of transitioning from an information instance i(j) to an attribute a(k), which is governed by transition probability P(i, k).

Based on the probabilities calculated from the stages, the system 100 calculates a relatedness value between an information instance and an attribute using the following formula:

$$R(j, k) = P(I)P(j, k) + \sum_{m=0}^{|I|} P(s, j, m)P(m, k) + \sum_{l=0}^{|C|} \left( P(c, j, l) \sum_{n=0}^{|I|} P(i, l, n)P(n, k) \right) \quad (6)$$

where R(j, k) is the relatedness value between information instance i(j) and attribute a(k); P(I) is a loop-back transition probability from information instance i(j) to i(j); P(s, j, m) is a transition probability from information instance i(j) to i(m); I is the set of all information instances; |I| is a number of all information instances, P(c, j, l) is a transition probability from information instance i(j) to class c(l); C is the set of all classes; |C| is a number of all classes, and P(i, l, n) is a transition probability from a class c(l) to an instance i(n). The values P(I), P(s, j, m), and P(c, j, l) satisfy the constraints set forth in formula (5).

These relatedness values can be used to rank the attributes a(0) through a(4) for each information instance, and thus generate a ranked list of attributes as output, for each information instance (e.g., i(0) and i(1)). The system 100 can acquire a ranked list of attributes [a(0), a(1), a(2), . . . , a(n)], such that as many relevant attributes as possible are among the attributes situated earlier in the ranked list.

Figure 7:
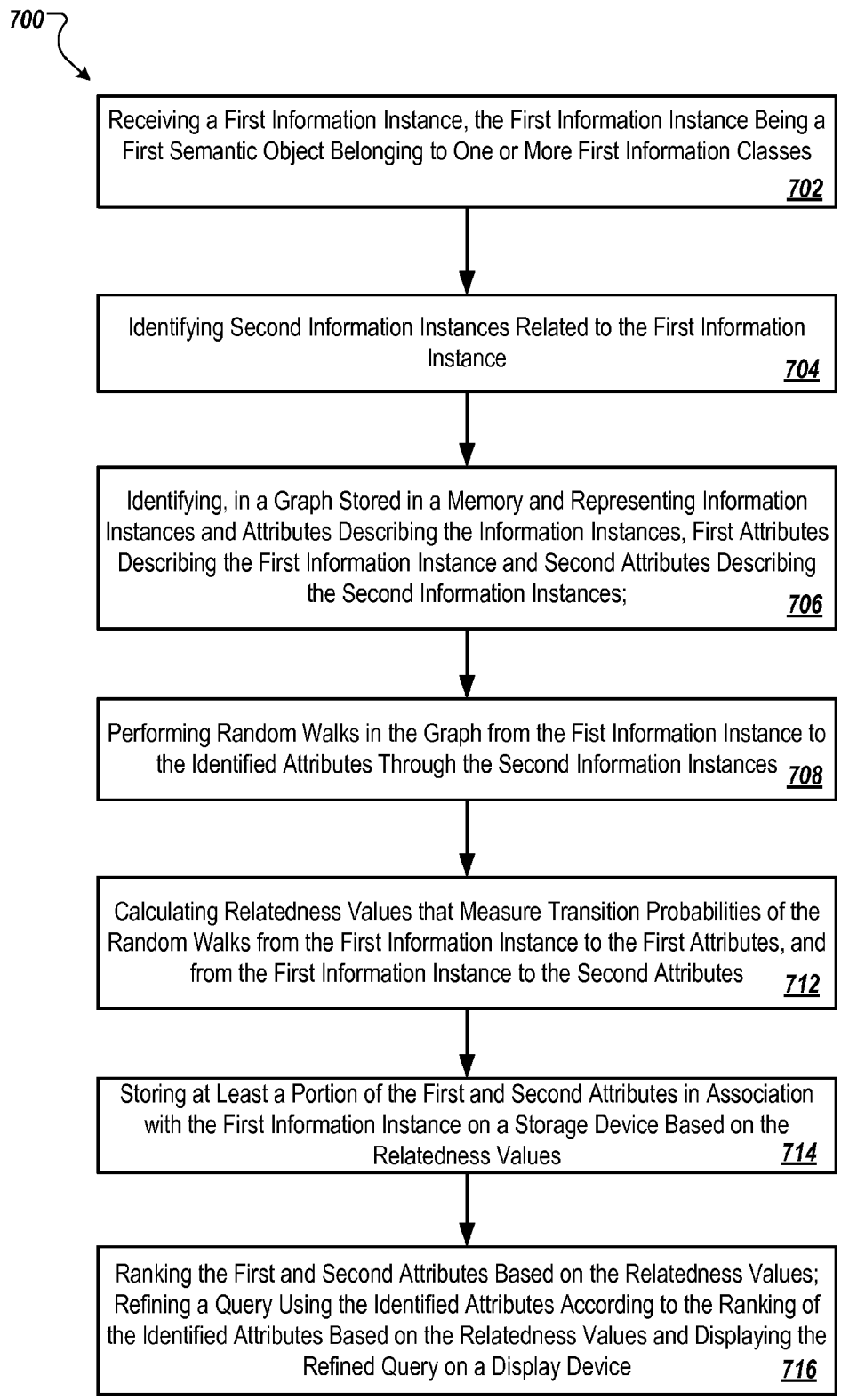
FIG. 7 is a flowchart illustrating an example process of extracting instance attributes from text.

FIG. 7 is a flowchart illustrating an example process 700 of extracting instance attributes from text. The process 700 can, for example, be implemented in a system such as the system 100 of FIG. 1.

In stage 702, the system receives a first information instance. The first information instance is a first semantic object belonging to one or more first information classes. In some implementations, the system receives a query including a query term. The query term can identify the first information instance. For example, the system 100 can receive a search query that includes a term "cloxacillin" that can be identified as information instance 110.

In stage 704, the system identifies a second information instance related to the first information instance. The second information instances are second semantic objects belonging to the one or more second information classes. For example, the system 100 can identify the information instances "ampicillin," "oxacillin," and "vicodin" that are related to information instance 110 "cloxacillin." The second information instances can be identified by "IsA" relations with one or more classes (e.g., "antibiotics"), or distributional similarity, or both.

In some implementations of stage 704, the system identifies second information instances when the second information instances form "IsA" pairs with a class with which the first information instance is in an "IsA" relationship. The system identifies the second information instances when the second information instances belong to the same classes as the first information instance does. To identify "IsA" pairs, the system identifies one or more classes (e.g., classes c(0) and c(1) of FIG. 3) to which the first information instance (e.g., information instance i(0) of FIG. 3) belongs. The system identifies other information instances (e.g., information instance i(1)) belonging to the identified information classes. The system designates the identified information instances (e.g., information instance i(1)) belonging to the identified information classes as the second information instances. The system can identify the classes and information instances belong to the classes using instance-class database 106.

In some implementations of stage 704, the system identifies the second information instances based on distributional similarities between the first information instance (e.g., information instance i(0) of FIG. 5) and the second information instances (e.g., information instance i(1) of FIG. 5). The distributional similarities can measure an extent to which the first information instance and the second information instance appear in identical textual contexts. The textual contexts can include a set of user queries as well as a set of web pages and other electronic document. The distributional similarities can be stored in, for example, instance-instance database 104.

In stage 706, the system identifies, in a graph stored in a memory and representing information instances and attributes that describe the information instances, first attributes describing the first information instance and second attributes describing the second information instances. The graph can be, for example, graph 200 of FIG. 2 including first information instance i(0) and a second information instance i(1), and attributes a(0) through a(4). The graph can have edges that represent probabilities of transition from the information instances to the attributes, as described above in reference to FIG. 2. The graph can be stored in instance-attribute database 108.

In stage 708, the system performs random walks in the graph from the first information instance to the identified attributes through the second information instances. In various implementations, the system adds class nodes (e.g., class nodes 251 of FIG. 6), various edges between information instances and classes (e.g., edges between instance nodes 250 and class nodes 251), various edges between information instances (e.g., edges between instance nodes 250a and

250b), and various loop-back edges (e.g., edges 238). The system performs the random walks following the paths that are made of the edges.

In some implementations, the system performs the random walks following a path that starts from the first information instance (e.g., information instance i(0) of FIG. 6) to a class (e.g., class c(0) of FIG. 6), from the class to the second information instances (e.g., information instance i(1) of FIG. 6), and from the second information instances to the attributes (e.g., attributes a(0) through a(4) of FIG. 6). In some implementations, the system performs the random walks following a path that starts from the first information instance (e.g., information instance i(0) of FIG. 6) to the second information instances (e.g., information instance i(1) of FIG. 6), and from the second information instances to the attributes (e.g., attributes a(0) through a(4) of FIG. 6). In some implementations, stage 708 includes performing random walks from the first information instance to the first information instance (e.g., following edges 238 of FIG. 6), and then from the first information instance to the attributes (e.g., a(0)-a(4) of FIG. 6).

In stage 712, the system calculates relatedness values that measure transition probabilities of the random walks from the first information instance to the first attributes (e.g., attributes that directly describe the first information instance), and from the first information instance to the second attributes (e.g., attributes that are propagated to the first information instance). Calculating the relatedness values can include calculating, for each attribute of the first and second attributes, a relatedness value that measures a relatedness between the first information instance and the attribute based on a probability that the random walks that start from the first information instance end at the attribute. The relatedness value between a first information instance (e.g., information instance i(0) of FIG. 6) and a particular attribute (e.g., attribute a(0)) of FIG. 6) can be calculated by a sum of the transition probabilities of each path starting from information instance i(0) ending at attribute a(0). In some implementations, the relatedness value between the information instance and the attribute is calculated using formula (6) as described above.

In some implementations, calculating the transition probability in stage 712 includes calculating a weight of an attribute in reference to an information instance. The attribute can be one among the first and second attributes (e.g., any attribute a(0) through a(4) of FIG. 26). The information instance can be one among the first information instance and second information instances (e.g., any information instance i(0) or i(1) of FIG. 6). The system can divide the weight by a sum of weights of all weights of the first and second attributes in reference to the information instance, and designating a quotient resulting from the dividing as the transition probability. In some implementations, the system can calculate the transition probability using formula (2) as described above.

In stage 714, the system stores at least a portion of the first and second attributes in association with the first information instance on a storage device based on the relatedness values. In some implementations, the system ranks the first and second attributes (e.g., attributes a(0)-a(4) of FIG. 6) based on the relatedness values between each of the first and second attributes and the first information instance (e.g., information instance i(0) of FIG. 6). The system stores one or more top-ranked attributes in association with the first information instance. In some implementations, the system determines a threshold value. The system stores one or more attributes whose relatedness values corresponding to the first information instance satisfies the threshold.

In stage 716, the system uses result of the relatedness values to refine queries. The first information instance (e.g., information instance i(0) of FIG. 6) can be identified by a query term from a query received by the system. The system can rank the first and second attributes based on the relatedness values. The system refines the query using the first and second attributes according to the rankings of the first and second attributes based on the relatedness values. The system can display the refined query on a display device. For example, the system receives a user query that contains a term that identifies "cloxacillin" as information instance 110. The system identifies a first attribute (e.g., "pharmacokinetics") and second attributes (e.g., "side effects," "cost," and "pregnancy"). The system ranks the attributes and uses the ranked attributes to refine the query. The refined query can include terms "cloxacillin pharmacokinetics" or "cloxacillin side effects." The system can display the refined query on a display device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a network routing device, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or a routing device, e.g., a network router, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs executing on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

An electronic document (which for brevity will simply be referred to as a document) can, but need not, correspond to a file. A document can be stored in a portion of a file that holds other documents, in a single file dedicated to the document in question, or in multiple coordinated files.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method executed by a data processing apparatus, comprising:
    identifying, in a graph stored in a memory and representing information instances and attributes describing the information instances, first attributes describing a first information instance and second attributes describing a plurality of second information instances related to the first information instance, wherein the graph includes attribute nodes each representing a respective attribute, instance nodes each representing a respective information instance, and edges each connecting an attribute node and an instance node, each edge representing that a non-zero likelihood exists that the attribute of the connected attribute is related to the information instance of the connected instance node, and wherein the graph further includes paths connecting pairs of instance nodes, wherein the existence of a path indicates that a semantic relationship exists between the information instances of the connected instance nodes;
    performing a first random walk in the graph from the first information instance to a first attribute of the second attributes through the second information instances;
    calculating a first relatedness value for the first random walk from the first information instance to the first attribute of the second attributes;
    determining that the first relatedness value for the first random walk from the first information instance to a first attribute of the second attributes satisfies a threshold relatedness value; and
    creating an edge between the first attribute of the second attributes and the first information instance in the graph.

2. The method of claim 1, wherein calculating the first relatedness value comprises:
    calculating a weighted list that maps the first and second attributes to the first information instance and second information instances; and
    calculating a transition probability the first information instance and second information instances to the first and second attributes based on the weighted list.

3. The method of claim 2, wherein calculating the transition probability comprises:
    calculating a weight of an attribute in reference to an information instance, the attribute being one among the first and second attributes, and the information instance being one among the first information instance and second information instances;
    dividing the weight by a sum of weights of all weights of the first and second attributes in reference to the information instance; and
    designating a quotient resulting from the dividing as the transition probability.

4. The method of claim 2, wherein calculating the transition probability comprises applying the following formula:

$$P(j, k) = \frac{W(j, k)}{\sum_{l=0}^{|A|} W(j, l)}$$

wherein:
P(j, k) is a probability of transition between information instance i(j) and attribute a(k);
A is a set of all attributes for information instance i(j); and
W(j, k) is a weight of attribute a(k) in reference to information instance i(j).

5. The method of claim 1, wherein:
    the graph includes class nodes each representing a respective information class, and the paths connecting pairs of instance nodes comprise paths connecting instance nodes to class nodes, each path connecting an instance node to a class node being a representation that the information instance represented by the instance node belongs to the class represented by the class node; and
    the method further comprises:
    identifying, in the graph, the one or more second information classes to which the first information instance belongs;
    identifying, in the graph, information instances belonging to the identified second information classes; and
    designating the identified information instances belonging to the identified second information classes as the second information instances.

6. The method of claim 5, wherein performing the first random walk comprises:
    from an instance node representing the first information instance, executing a first random move to a class node representing one of the identified second information classes;
    from the class node representing the one of the identified second information classes, executing a second random move to an instance node representing one of the second information instances belonging to the identified second information class; and
    from the instance node representing the second information instance, executing a third random move to an attribute node representing a second attribute.

7. The method of claim 5, wherein performing the first random walk comprises:
    from an instance node representing the first information instance, executing a first random move to the instance node representing the first information instance; and
    from the instance node representing the first information instance, executing a second random move to an attribute node representing a first attribute.

8. The method of claim 1, wherein:
the paths connecting pairs of instance nodes comprise edges connecting instance nodes to other instance nodes, each edge connecting an instance node to another instance node representing a distributional similarity between information instances represented by the respective instance nodes, the distributional similarities measuring an extent to which the first information instance and the second information instances appear in similar textual contexts; and
wherein the method further comprises:
identifying the second information instances based on the distributional similarities between the first information instance and the second information instances represented by the paths in the graph.

9. The method of claim 8, wherein performing the first random walk comprises:
from an instance node representing the first information instance, executing a first random move to an instance node representing one of the second information instances along one or more of the paths connecting pairs of instance nodes; and
from the an instance node representing one of the second information instances, executing a second random move to an attribute node representing a second attribute.

10. The method of claim 8, wherein performing the first random walk comprises:
from an instance node representing the first information instance, executing a random move to the instance node representing the first information instance; and
from the instance node representing the first information instance, executing a second random move to an attribute node representing a first attribute.

11. The method of claim 1, where calculating the first relatedness value comprises calculating, for each attribute of the first and second attributes, a relatedness value that measures a relatedness between the first information instance and the attribute based on a probability that the random walks that start from the first information instance end at the attribute.

12. The method of claim 1, further comprising receiving a query including a query term, the query term identifying the first information instance.

13. The method of claim 12, further comprising:
ranking the first and second attributes based on the first relatedness value and a second relatedness value;
refining the query using the first and second attributes according to the ranking of the first and second attributes based on the first and second relatedness values; and
displaying the refined query on a display device.

14. The method of claim 1, where the one or more second information classes include the first information class.

15. A system, comprising:
one or more computers configured to perform operations comprising:
identifying, in a graph stored in a memory and representing information instances and attributes describing the information instances, first attributes describing a first information instance and second attributes describing a plurality of second information instances related to the first information instance, wherein the graph includes attribute nodes each representing a respective attribute, instance nodes each representing a respective information instance, and edges each connecting an attribute node and an instance node, each edge representing that a non-zero likelihood exists that the attribute of the connected attribute is related to the information instance of the connected instance node, and wherein the graph further includes paths connecting pairs of instance nodes, wherein the existence of a path indicates that a semantic relationship exists between the information instances of the connected instance nodes;
performing a first random walk in the graph from the first information instance to a first attribute of the second attributes through the second information instances;
calculating a first relatedness value for the first random walk from the first information instance to the first attribute of the second attributes;
determining that the first relatedness value for the first random walk from the first information instance to a first attribute of the second attributes satisfies a threshold relatedness value; and
creating an edge between the first attribute of the second attributes and the first information instance in the graph.

16. The system of claim 15, wherein calculating the first relatedness value comprises:
calculating a weighted list that maps the first and second attributes to the first information instance and second information instances; and
calculating a transition probability the first information instance and second information instances to the first and second attributes based on the weighted list.

17. The system of claim 16, wherein calculating the transition probability comprises:
calculating a weight of an attribute in reference to an information instance, the attribute being one among the first and second attributes, and the information instance being one among the first information instance and second information instances;
dividing the weight by a sum of weights of all weights of the first and second attributes in reference to the information instance; and
designating a quotient resulting from the dividing as the transition probability.

18. The system of claim 15, wherein:
the graph includes class nodes each representing a respective information class, and the paths connecting pairs of instance nodes comprise paths connecting instance nodes to class nodes, each path connecting an instance node to a class node being a representation that the information instance represented by the instance node belongs to the class represented by the class node; and
the operations further comprise:
identifying, in the graph, the one or more second information classes to which the first information instance belongs;
identifying, in the graph, information instances belonging to the identified second information classes; and
designating the identified information instances belonging to the identified second information classes as the second information instances.

19. The system of claim 18, wherein performing the first random walk comprises:
from an instance node representing the first information instance, executing a first random move to a class node representing one of the identified second information classes;
from the class node representing the one of the identified second information classes, executing a second random move to an instance node representing one of the second information instances belonging to the identified second information class; and from the instance node representing the second information instance, executing a third random move to an attribute node representing a second attribute.

20. The system of claim 18, wherein performing the first random walk comprises:
   from an instance node representing the first information instance, executing a first random move to the instance node representing the first information instance; and
   from the instance node representing the first information instance, executing a second random move to an attribute node representing a first attribute.

\* \* \* \* \*